UNITED STATES PATENT OFFICE.

EDWARD H. JACOB, OF WEST CHESTER, PENNSYLVANIA.

PROCESS OF PRESERVING MUSHROOMS.

1,018,909.　　　　　Specification of Letters Patent.　　Patented Feb. 27, 1912.

No Drawing.　　Application filed September 15, 1911.　Serial No. 649,494.

*To all whom it may concern:*

Be it known that I, EDWARD H. JACOB, a citizen of the United States, residing at West Chester, in the county of Chester and State of Pennsylvania, have invented a new and useful Process of Preserving Mushrooms, of which the following is a specification.

My improved process has as its leading object the preservation of mushrooms so as to prevent the loss of their natural flavor. This object is accomplished, in the preferred practice, by subjecting the mushrooms to an evaporating operation at a temperature of from 100 to 150 degrees F. until their weight has been reduced to approximately one-half through loss of water; then washing in cold water to cleanse and freshen the product; then dipping, for a period of from 1 to 3 minutes, in a bath of scalding water containing citric acid and salt in the approximate proportions of 12 gallons of water, 1½ ounces of citric acid and 5 pounds of salt; then coating with hot oil, suitably by dipping in hot cottonseed or olive oil, and then heating for a period of from 10 to 30 minutes (depending upon the bulk treated) at a temperature ranging from 212 to 250 degrees F., suitably by placing the mushrooms at a temperature of about 150 degrees F. in a container, which is closed and heated to effect the desired sterilizing or processing.

While the foregoing treatment has been found to effect the preservation of mushrooms without loss of flavor so that the preserved product may not be distinguished from the fresh it will be understood that such treatment may be varied by omitting certain operations, as washing in cold water and dipping in scalding water containing citric acid and salt, and by modifying the degree of the treatment as by changing the time and temperature of the operations; or the mushrooms may be sterilized in water or brine directly after being subjected to the evaporating operation. It is important, however, that the treatment shall not drive off or cause the loss of the natural juices of the mushrooms, as by the use of high and prolonged heat in effecting the evaporation of the water, which is preferably driven off at a temperature between 100 and 150 degrees F.

Having described my invention, I claim:

1. A process for preserving mushrooms which comprises evaporating them for such time and at such temperature as will drive off a substantial bulk of water therefrom without expelling the natural juices and treating the product so as to effect sterilization thereof.

2. A process for preserving mushrooms which comprises evaporating water therefrom, treating them with oil and heating them.

3. A process for preserving mushrooms which comprises evaporating water therefrom without driving off the juices, coating the evaporated product with vegetable oil, and heating the coated product so as to effect sterilization thereof.

4. A process for preserving mushrooms which comprises evaporating the water therefrom at a temperature below 150 degrees F., dipping the evaporated product in oil, and heating the oil coated product at such temperature and for such time as may be required to effect sterilization.

5. A process of treating mushrooms which comprises subjecting them to an evaporating operation until about 50 per cent. of their weight in water has been driven off, washing the product in cold water, treating the washed product with an oil, and heating the oil coated product at such temperature and for such time as may be required to effect sterilization.

6. A process for preserving mushrooms which comprises evaporating them for such time and at such temperatures as will drive off the bulk of the water without expelling the natural juices, washing the evaporated product in cold water, subjecting the washed product to the action of scalding water containing salt and citric acid, coating the product with oil, and heating the coated product at a temperature of approximately 240 degrees F. for sufficient time to effect sterilization.

In witness whereof I have hereunto set my name this 13th day of September, 1911, in the presence of the subscribing witnesses.

EDWARD H. JACOB.

Witnesses:
　M. R. DARLINGTON,
　JOS. G. DENNY, Jr.